No. 884,127. PATENTED APR. 7, 1908.
L. P. CARROLL.
COMBINED WAGON AND TRUCK.
APPLICATION FILED OCT. 3, 1907.
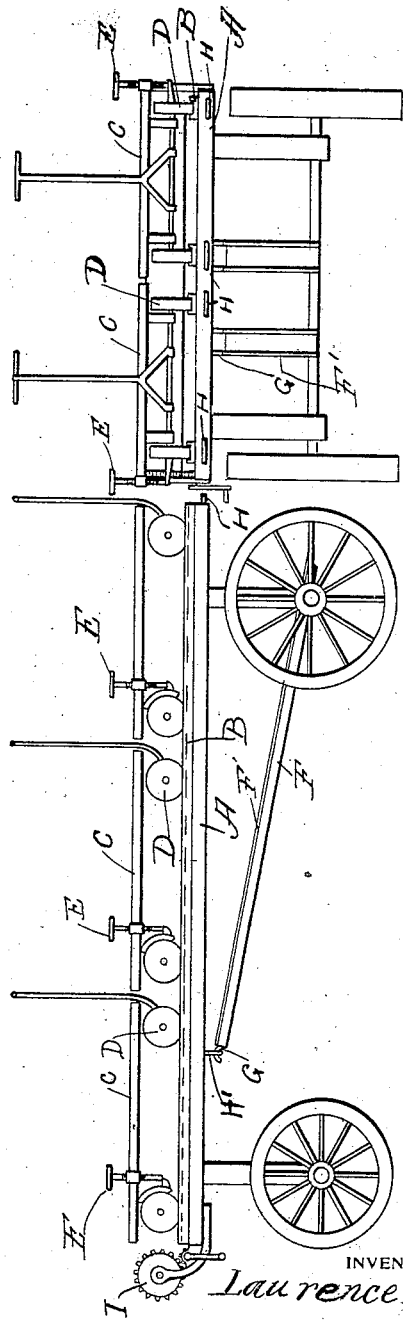
Witnesses
Francis A. Pocock
J. J. Williamson
INVENTOR
Laurence P. Carroll
BY
ATTORNEY

UNITED STATES PATENT OFFICE.

LAURENCE P. CARROLL, OF NEW YORK, N. Y.

COMBINED WAGON AND TRUCK.

No. 884,127.   Specification of Letters Patent.   Patented April 7, 1908.

Application filed October 3, 1907. Serial No. 395,670.

*To all whom it may concern:*

Be it known that I, LAURENCE P. CARROLL, a citizen of the United States, residing at New York, county of New York, and State of New York, have invented a certain new and useful Improvement in Combined Wagons and Trucks, of which the following is a specification.

My invention relates to a new and useful improvement in combined wagons and trucks, and has for its object to so construct and combine a wagon and a series of trucks as to facilitate the loading of the wagon by first loading the trucks and then rolling them onto tracks located upon the wagon and locking them in place.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of a wagon made in accordance with my improvement showing the trucks loaded thereon. Fig. 2, an end view thereof.

In carrying out my invention as here embodied, A represents the body of the wagon mounted upon suitable wheels in the usual manner and upon this body is placed the grooved rails B.

C. represents the trucks mounted upon wheels D, which latter are adapted to run in the grooved rails B, and E are brakes adapted to set or lock the wheels of the trucks by the hand-screws of said brakes, so that when said trucks are loaded upon the wagon, they will be prevented from rolling therefrom.

F represents one of the skids, which have secured thereon the grooved tracks F' which correspond with the grooved tracks B, and these skids are provided with the hooks G by which they are attached to the rear of the wagon, said hooks being engaged with staples H on the rear of the wagon body. Staples H', secured to the under side of the body support the hooks of the skids at one end of the latter, the opposite ends of the skids resting on the rear axles. When these skids are in place, it will be obvious that the trucks C may be readily rolled up the skids on to the wagon, and for the purpose of accomplishing this, especially where the trucks are loaded with heavy material, I provide a windlass I at the front end of the wagon so that a rope coiled upon the drum of this windlass and attached to the trucks, may be utilized to draw said trucks up the skids and on to the wagon.

In practice the trucks are first loaded and then run upon the body of the wagon, thus greatly facilitating the loading of the wagon by avoiding the necessity of having to stack the boxes or other articles upon the body, this operation taking place in the store or warehouse and the trucks being rolled to the wagon.

My improvement may be utilized for loading and unloading railroad cars (freight, baggage and express) in which case the trucks are first loaded and pushed on to the cars over grooved rails, the same as in the case of wagons. The cars would be provided with suitable grooved rails built into the floors to accommodate the loaded trucks, and the loaded trucks would be supplied with brakes to keep them from rolling on their wheels when the train is moving. By this means breakage and re-handling of goods would be avoided, and very much annoyance and loss of time would be dispensed with, for the trucks on which the goods were received would also be the trucks on which the goods are delivered without a transfer.

Of course I do not wish to be limited to the exact details of construction here shown as these may be varied to adapt my improvement to any other style of wagon or hand truck.

Having thus fully described my invention, what I claim as new and useful, is—

In combination with the body of a wagon, a pair of tracks thereon, wheeled trucks engaging said tracks, a pair of staples secured to the rear end of said body and in alinement with said tracks, a second pair of staples on the under side of said body adjacent to the front thereof, a pair of separate and independent skids, tracks on said skids, and hooks on the front ends of said skids, said hooks when the skids are in operative position engaging said first named staples, and when in inoperative position engaging said second pair of staples and having their rear ends seated on the rear axle of the wagon.

In testimony whereof, I have hereunto affixed my signature in the presence of two subscribing witnesses.

LAURENCE P. CARROLL.

Witnesses:
DAVID Y. FORCE,
PETER J. HERRICKS.